US006967991B1

(12) United States Patent
Haga et al.

(10) Patent No.: US 6,967,991 B1
(45) Date of Patent: Nov. 22, 2005

(54) DEVICE FOR CANCELING INTERFERENCE

(75) Inventors: Hiroki Haga, Yokosuka (JP); Mitsuru Uesugi, Yokosuka (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,535

(22) PCT Filed: Mar. 28, 2000

(86) PCT No.: PCT/JP00/01912

§ 371 (c)(1),
(2), (4) Date: Nov. 30, 2000

(87) PCT Pub. No.: WO00/60789

PCT Pub. Date: Oct. 12, 2000

(30) Foreign Application Priority Data

Apr. 1, 1999 (JP) .................................. 11-095044

(51) Int. Cl.$^7$ ............................................ H04B 1/707
(52) U.S. Cl. ................................................... 375/148
(58) Field of Search ............................... 375/148, 346, 375/341, 140, 147, 144

(56) References Cited

U.S. PATENT DOCUMENTS

| 5,619,524 | A | * | 4/1997 | Ling et al. .................... 375/200 |
| 6,002,727 | A | | 12/1999 | Uesugi ......................... 375/346 |
| 6,282,233 | B1 | * | 8/2001 | Yoshida ....................... 375/148 |
| 6,396,867 | B1 | * | 5/2002 | Tiedemann et al. .......... 375/141 |
| 6,501,788 | B1 | * | 12/2002 | Wang et al. ................. 375/148 |

FOREIGN PATENT DOCUMENTS

| JP | 10065572 | 3/1998 |
| JP | 10126383 | 5/1998 |
| JP | 10308690 | 11/1998 |
| JP | 11266184 | 9/1999 |
| JP | 11266226 | 9/1999 |

OTHER PUBLICATIONS

Yoshino et al., "Interference Canceling Equalizer (ICE) for Mobile Radio Communications", IEEE International Conference on Communications 1994, Conference Record, Serving Humanity through Communications, May 1-5, 1994, vol. 3, pp. 1427-1432.*
PCT International Search Report dated Jul. 4, 2000.

(Continued)

*Primary Examiner*—Mohammed Ghayour
*Assistant Examiner*—Dung X. Nguyen
(74) *Attorney, Agent, or Firm*—Stevens, Davis, Miller & Mosher, LLP (57) ABSTRACT

A delay device 102 sends reception signals to a subtraction device 113 after delaying it by a predetermined time. Matched filters 103-1~103-N perform despreading operation of the reception signals. RAKE-combining devices 104-1~104-N perform RAKE-combining operation of the signals after the despreading operation. Discrimination devices 105-1~105-N perform hard decision of the signals after the RAKE-combining operation. A decision value buffer 107 stores the signals after the hard decision. Likelihood calculation devices 106-1~106-N calculate likelihood of all the symbols. A likelihood buffer 108 stores calculated likelihood. A controlling part 110 controls a switch 109. A ranking decision device 111 decides a ranking based on the likelihood. A re-spreading device 112 performs re-spreading operation of a symbol with the highest likelihood ranking. And a subtraction device 113 subtracts the re-spreading result from the delayed reception signals.

3 Claims, 4 Drawing Sheets

OTHER PUBLICATIONS

Mitsuru Uesugi et al., "Improvement the Characteristics of SRIC (Symbol Ranking Type Interference Canceller)," Extended Abstracts of General Meeting, IEICE, Tsushin 1, SB-4-2 (Jun. 3, 1998), pp. 715-716 (in Japanese) with partial translation (in English) thereof.

Mitsuru Uesugi et al., "A Study about an Interference Canceller for Uplink Signal of CDMA System," Technical Report of IEICE, DSP96-115, SAT96- 110, RCS96-121 (Jan. 1997), pp. 51-56 (in Japanese) with abstract (in English) thereof.

Mamoru Sawahashi et al., "Serial Canceler Using Recursive Channel Estimation by Pilot Symbols for DS-CDMA," Technical Report of IEICE, SAT95-14, RCS95--50 (Jul. 1995), pp. 43-48 (in Japanese) with abstract (in English) thereof.

* cited by examiner

FIG. 1

PRIOR ART

DEVICE FOR CANCELING INTERFERENCE

TECHNICAL FIELD

The present invention relates to a device for canceling interference which is used for a mobile communication system using a CDMA (Code Division Multiple Access) method.

BACKGROUND ART

In the mobile communication system using the CDMA method, signals which are received in reception side devices suffer various kinds of signal interference to cause characteristic deterioration, as signals of a plurality of users are transmitted on the same frequency band. Conventionally, there has been a device for reduction of the above interference, according to Japanese patent application No. Hei-10-126383. A conventional device for canceling interference will be described below, referring to FIG. 1.

Figure 1:
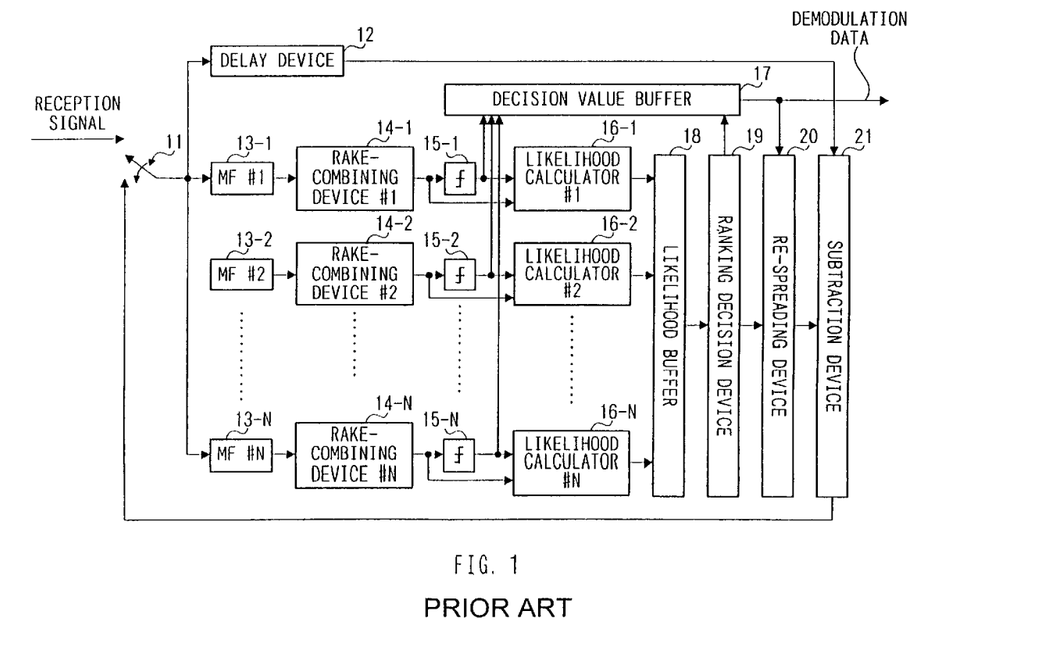
FIG. 1 is a block diagram illustrating a schematic configuration of a conventional device for canceling interference.

FIG. 1 is a block diagram of a conventional device for canceling interference. In the first place, signals of all users in a unit interval are sent as reception signals to a delay device 12 and matched filters 13-1~13-N through a switch 11. Here, a case where the above unit interval is assumed to be one slot will be described. In the delay device 12, the reception signals are sent to a subtraction device 21 described later, after they are delayed by a predetermined time.

Matched filters 13-1~13-N perform correlation (despreading) operation on the reception signals, using spreading codes assigned to each user, and signals in which controlled signals of other users and thermal noises and so on are suppressed, are obtained. The obtained signals of users 1-$n$ are sent to RAKE-combining devices 14-1~14-N, respectively.

At the RAKE-combining devices 14-1~14-N, RAKE-combining of signals of the users 1-$n$ is performed to improve the quality of the signals. The signals of the users 1-$n$ after the combining are sent to discrimination devices 15-1~15-N and likelihood calculators 16-1~16-N, respectively.

In the discrimination devices 15-1~15-N, hard decision of the signals of the users 1-$n$ is performed, and the signals after the decision are sent to the likelihood calculators 16-1~16-N, respectively, and to a decision value buffer 17. The signals after the decision sent from the discrimination devices 15-1~15-N are stored in the decision value buffer 17. That is, the signals of the users 1-$n$ after the decision are stored in the decision value buffer 17.

The signals output from the RAKE-combining devices 14-1~14-N, and the ones after the decision discrimination devices 15-1~15-N are input to the likelihood calculators 16-1~16-N. That is, the signals before and after the hard decision are input to the likelihood calculators 16-1~16-N. In the likelihood calculators 16-1~16-N, likelihood of all the symbols of each of signals of all the users 1-$n$ are calculated. The above likelihood are indices denoting the probabilities of the above symbols, and the shorter the Euclidean distances between the signals before and after the hard decision are, and the greater the likelihood are. The signals on the above likelihood are sent to a likelihood buffer 18.

The signals on the above likelihood sent from the likelihood calculators 16-1~16-N are stored in the likelihood buffer 18, and, sent to a ranking decision device 19.

In the ranking decision device 19, the ranking for each of all the symbols of signals of all the users is decided in order of greatness of the likelihood, based on the above likelihood. The above results are sent to a re-spreading device 20.

In the decision value buffer 17, a hard decision value of the highest symbol in the above ranking for stored signals is output as demodulation data, and sent to the re-spreading device 20, when the ranking is decided by the ranking decision device 19 as mentioned above.

In the re-spreading device 20, the hard decision value of the symbol with the greatest likelihoodent from the decision value buffer 17 is re-spread by the similar spreading code to the one at the above despreading to be sent to the subtraction device 21.

In the subtraction device 21, signals re-spread in the re-spreading device 20 are subtracted from the reception signals delayed by the delay device 12. The signals after the subtraction as mentioned above become the reception signals in which the symbol with the greatest likelihood and effects (interference) of the above symbol are completely cancelled, if the hard decision by the discrimination devices 15-1~15-N is correct. The signals after the subtraction as described above in the subtraction device 21, that is, the signals after cancellation of interference are sent to the delay device 12 and the matched filters 13-1~13-N through the switch 11.

Hereinafter, the above despreading, RAKE-combining, hard decision, and likelihood calculation are performed only for symbols under the effect of interference by the symbol with the greatest likelihood. Thereby, signals of all the users after the hard decision in the signals in which the symbol with the greatest likelihood and effects of the above symbol are removed, are stored in the decision value buffer 17. And, the signal concerning the likelihood of all the symbols of signals of all the users in the signals in which the symbol with the greatest likelihood and effects of the above symbol are removed, are stored in the decision value buffer 18.

Moreover, in the ranking decision device 19, re-ranking of all the symbols of signals of all the users is performed for updating, based on the likelihood. During the above ranking, the ranking is updated, excluding a symbol which is decided to have the greatest likelihood in the previous ranking operation. After updating of the ranking, the symbol with the greatest likelihood is output as demodulation data, as mentioned above, and subtracted from the signals sent from the delay device 12 by the subtraction device 21 after re-spreading by the re-spreading device 20. At this point, signals canceling the interference by each symbol with the first and the second high ranking based on the amounts of the likelihood from the reception signals are output from the subtraction device 21.

Thereafter, similar operations to those of the above are performed, until all the symbols of signals of all the users are demodulated. Thereby, demodulation data in which interference among signals is cancelled, are obtained.

However, in order to cancel interference from the reception signals, the above conventional device for canceling interference updates the ranking of all the symbols of signals of all the users, every demodulation of one symbol, that is, whenever a new likelihood is stored in the likelihood buffer, until all the symbols of signals of all the users are demodulated. As a result, there is a problem from a view point of cancellation processing speed, circuit configurations, and so on that there is less possibility to realize the above conventional device for canceling interference, as an enormous amount of operations are required to cancel effects by interference from the reception signals.

DISCLOSURE OF INVENTION

The present invention has been made under the above circumstances. The object of the invention is to offer a device for canceling interference while reducing amount of operations for canceling interference.

The above object is achieved by proper updating of the likelihood ranking, based on the accuracy of the demodulation data due to the updating of the likelihood ranking.

BEST MODE FOR CARRYING OUT THE INVENTION

Thereafter, embodiments according to the present invention will be described in detail, referring to drawings.

Embodiment 1

Figure 2:
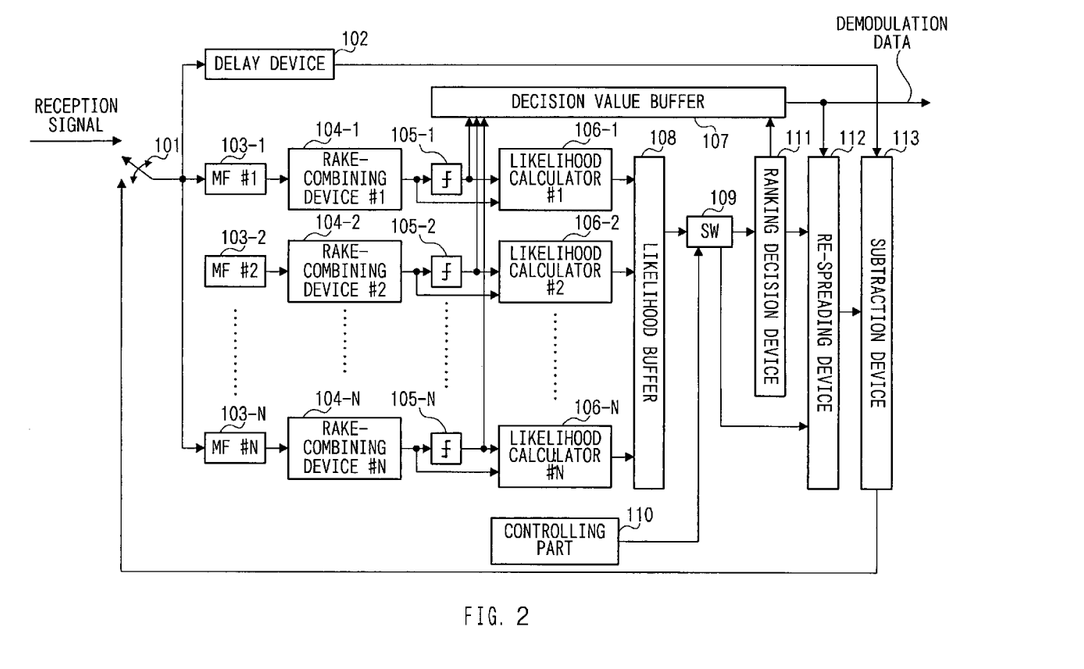
FIG. 2 is a block diagram illustrating a schematic configuration of a device for canceling interference according to an embodiment 1 of the present invention.

FIG. 2 is a block diagram illustrating a schematic configuration of a device for canceling interference according to an embodiment 1 of the present invention. In FIG. 2, reception signals are the signal received through an antenna (not shown), and signals in which a plurality of users are multiplexed in the same frequency band according to the CDMA method. A switch 101 selects the reception signals or signals sent from a subtraction device 113 described later for sending to a delay device 102 and matched filters 13-1~13-N.

The delay device 102 sends the signals selected by the switch 101 to the subtraction device 113 after delaying them by a predetermined time. Matched filters 103-1~103-N perform despreading operation on the signals selected by the switch 101, using spreading codes assigned to each matched filter, and send the signals after completion of the despreading operation to RAKE combining devices 104-1~104-N, respectively.

The RAKE-combining devices 104-1~104-N perform RAKE combining of signals after completion of the despreading operation sent respectively from the matched filters 103-1~103-N, and send the ones after completion of the RAKE combining to discrimination devices 105-1~105-N and likelihood calculators 106-1~106-N, respectively.

The discrimination devices 105-1~105-N perform hard decision of signals after completion of the RAKE-combining sent respectively from the RAKE combining devices 104-1~104-N, and send the signals after completion of the hard decision to the likelihood calculators 106-1~106-N, respectively, and the decision value buffer 107.

The signals after the RAKE-combining sent respectively from the RAKE combining devices 105-1~105-N, and those after the hard decision sent respectively from the discrimination devices 105-1~105-N are input to the likelihood calculators 106-1~106-N, which perform likelihood calculation of all the symbols of signals of each user to send the signals concerning the above calculated likelihood to a likelihood buffer 108.

The signals concerning the above likelihood sent from the likelihood calculators 106-1~106-N are input to the likelihood buffer 108, and information concerning the above likelihood is stored in the buffer 108 and the signals concerning the above likelihood are sent to the switch 109.

Signals concerning the likelihood sent from the likelihood buffer 108 are input to the switch 109, which sends the input signals concerning the likelihood to either a ranking decision device 111 or a re-spreading device 112 according to control of a controlling part 110 which sends a signal (hereinafter, called as "updating-of-ranking signal") for control of updating of the ranking to the switch 109. The switch 109 and the controlling part 110 are specifically described below.

The signals concerning the likelihood sent from the likelihood buffer 108 are input to the ranking decision device 111 through the switch 109, and the device 111 performs ranking of all the symbols of signals of each user based on the amounts of the likelihood, and, moreover, sends the signals concerning the ranking results to the decision value buffer 107 and the re-spreading device 112.

The decision value buffer 107 stores the signals after the hard decision sent from the discrimination devices 105-1~105-N, and, outputs the signal having the symbol with the greatest likelihood after the hard decision as demodulation data to the re-spreading device 112, based on the signals sent from the ranking decision device 111.

The re-spreading device 112 performs re-spreading on the signals sent from the decision value buffer 107, based on the signals sent from the ranking decision device 111, or the switch 109, for sending the signals after the re-spreading to the subtraction device 113, which performs subtraction operation between the signals after re-spreading sent from the re-spreading device 112 and the delayed reception signals sent from the delay device 102, and outputs the signals after the subtraction operation as signals after cancellation of interference.

Then, the operation of the device for canceling interference with the above configuration will be described below. In the first place, signals of all users in a unit interval are sent as reception signals to the delay device 102 and the matched filters 103-1~103-N through the switch 101. Here, a case where the above unit interval is assumed to be one slot will be described, in the present embodiment. But, the present invention is not limited to the above case. In the delay device 102, the reception signals are sent to the subtraction device 113, after the signals are delayed by a predetermined time.

The matched filters 103-1~103-N perform correlation (despreading) operation on the reception signals, using spreading codes assigned to each user, and signals in which signals of other users and thermal noises and so on are suppressed, are obtained. The obtained signals of the users 1-$n$ are sent to RAKE-combining devices 104-1~104-N, respectively.

In the RAKE-combining devices 104-1~104-N, the RAKE-combining of signals of the user 1-$n$ is performed to improve the quality of the signals. The signals of the user 1-$n$ after the RAKE combining are sent to discrimination devices 105-1~105-N and the likelihood calculators 106-1~106-N, respectively.

In the discrimination devices 105-1~105-N, hard decision of the signals of the users 1-$n$ is performed.

Now, the signals after the above hard decision are assumed to be reception results, in a receiver using a general CDMA method. However, the signals of the users are not completely separated from each other by the matched filters 103-1–103-N, when the spreading codes of the signals of the users 1-$n$ are not orthogonal to each other. Moreover, even if the spreading codes of signals of each user are orthogonal to each other, the interference is caused, when the time correlation is not zero.

According to the above factors, the signals of the users 1-$n$ after the hard decision output from the discrimination devices 105-1~105-N are more deteriorated, as the total number of the users is increased. Therefore, the signals of the users 1-$n$ after the hard decision are further processed, as described below, in the device for canceling interference according to the present embodiment.

The signals of the users 1-$n$ after the hard decision are sent to the likelihood calculators 106-1~106-N, respectively, and to the decision value buffer 107. The signals of the users 1-$n$ after the hard decision are stored in the decision value buffer 107. That is, the signals of the users 1-$n$ after the hard decision for the one slot are stored in the decision value buffer 107.

The signals output from the RAKE-combining devices 104-1~104-N, and the ones output from the discrimination devices 105-1~105-N are input to the likelihood calculators 106-1~106-N. That is, the signals before and after the hard decision are input to the likelihood calculators 106-1–106-N. In the likelihood calculators 106-1~106-N, lilelihoods of all the symbols of each of signals of the users 1-$n$ are calculated. The above likelihood are indices denoting the probabilities of the above symbols, and the shorter the Euclidean distances between the signals before and after the hard decision are, and the greater the lkelihoods are. The signals concerning the above likelihood are sent to the likelihood buffer 108.

The signals concerning the above likelihood sent from the likelihood calculators 106-1~106-N are stored in the likelihood buffer 108, and sent to the switch 109.

In the switch 109, the signals concerning the above likelihood from the likelihood buffer 108 are sent to either the ranking decision device 111, or the re-spreading device 112, according to the updating-of-ranking signals output from the controlling part 110. That is, the signals concerning the above likelihood are sent to the ranking decision device 111, when updating operation of ranking is required, and, on the other hand, to the re-spreading device 112, when it is not required.

The updating-of-ranking signals are decided by the controlling part 110, so that the accuracy (error rate) of the demodulation data output from the decision value buffer 107 becomes the best, further, so that an amount of operations required for obtaining all the demodulation data are reduced. The details of the updating-of-ranking signals will be described below.

In the first place, an updating-of-ranking signals denoting that the updating-of-ranking operation is required is configured to be output, and, then, the signals concerning the above likelihood are sent to the ranking decision device 111 through the switch 109.

In the ranking decision device 111, ranking decision is performed based on the above likelihood, and, then, the ranking of all the symbols of signals of all the users is decided in order of greatness of likelihood. The above ranking results are sent to the decision value buffer 107, and the re-spreading device 112.

In the decision value buffer 107, a hard decision value of a symbol with the greatest likelihood for the above stored signals is output as a demodulation data, and sent to the re-spreading device 112, based on the ranking results from the ranking decision device 111.

In the re-spreading device 112, the hard decision value of the symbol with the greatest likelihoodent from the decision value buffer 107 is re-spread by the identical spreading code to the one at the above despreading to be sent to the subtraction device 113.

In the subtraction device 113, signals re-spread in the delay device 112 are subtracted from the reception signals delayed by the delay device 102. The signals after the above subtraction become the reception signals in which the symbol with the greatest likelihood and effects (interference) of the above symbol are completely removed, if the hard decision with the discrimination devices 105-1~105-N is correct. The signals after the above subtraction in the subtraction device 113, that is, the signals after cancellation of interference are sent to the delay device 102, and the matched filters 103-1~103-N, through the switch 101.

Thereafter, the above despreading, RAKE-combining, hard decision, and likelihood calculation are performed only for symbols under interference by the symbol with the greatest likelihood. Thereby, signals of all the users after the hard decision in the signal in which the symbol with the greatest likelihood and effects of the above one are removed, are stored in the decision value buffer 107. In other words, signals of all the users after the hard decision which are stored in the decision value buffer 107, are equivalent to the signals after the hard decision which have been previously stored in the decision value buffer 107, in which the part corresponding to symbols under effects of the symbol with the greatest likelihood is updated.

Moreover, signals concerning the likelihood for all the symbols of signals of all the users, in the signals in which the symbol with the greatest likelihood and effects of the above one are removed, are stored in the likelihood buffer 108. In other words, signals concerning the above likelihood which are stored in the likelihood buffer 108, are equivalent to the signals concerning the likelihood which have been previously stored in the likelihood buffer 108 in which the part corresponding to symbols under effects of the symbol with the greatest likelihood is updated.

In each signal which are stored in the decision value buffer 107 and the likelihood buffer 108 this time, the content of the part corresponding to the symbol with the greatest likelihood is identical to that of the case where each signal has been previously stored.

And, the signals concerning the likelihood from the likelihood buffer 108 are sent to either the ranking decision device 111, or the re-spreading device 112 by switching with the switch 109 according to the updating-of-ranking signals from the controlling part 110, as mentioned above.

When the updating-of-ranking operation is required, the signals concerning the above likelihood are sent to the ranking decision device 111, where the above ranking (updating of ranking) is performed, based on the signals concerning the above likelihood in which the contents are changed. The signals concerning the updating results of rankings are sent to the decision value buffer 107 and the re-spreading device 112.

When the updating-of-ranking operation is not required, the signals concerning the above likelihood are sent directly to the re-spreading device 112. That is, in the above case, the signals concerning the previous ranking results are sent to the re-spreading device 112, and, (through a not-shown line), to the decision value buffer 107, without updating of the ranking by the ranking decision device 111.

In either of the above cases, the signals after hard decision having the symbol with the greatest likelihood are output as demodulation data to the re-spreading device 112, based on the signals concerning the ranking results from the ranking decision device 111 or the switch 109, in the decision value buffer 107. However, the symbol which has been previously selected as the one having the highest likelihood is excluded in the above.

Thereafter, the hard decision value of the symbol with the greatest likelihoodent from the decision value buffer 107 is re-spread and sent to the subtraction device 113, as mentioned above, in the re-spreading device 112. In addition, the signals re-spread by the re-spread device 112 is subtracted from the signals delayed by the delay device 102, in the subtraction device 113. At the above time, the signals after the above subtraction as mentioned above are equivalent to those in which the symbols with the first and the second greatest likelihood, respectively, and the interference by those symbols are cancelled from the first reception signals.

The signals after the above subtraction as mentioned above, that is, the signals after cancellation of interference are sent to the delay device 102 and the matched filters 103-1~103-N through the switch 101. Thereafter, similar operations to those of the above are performed, until all the symbols of all the users are demodulated. As a result, demodulation data in which interference among signals is cancelled, are obtained.

Figure 3A:
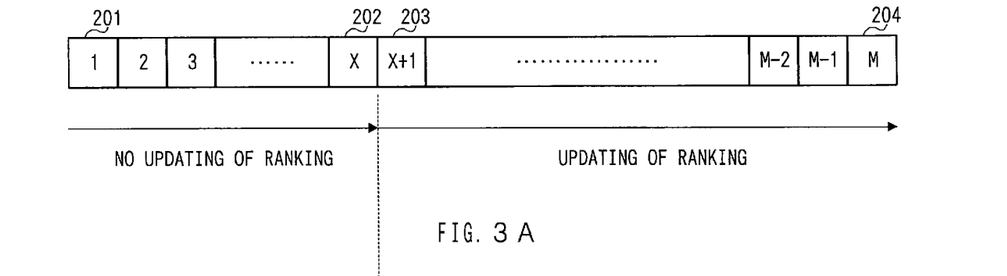
FIG. 3A is a schematic diagram illustrating a result where all the symbols are arranged, based on a likelihood ranking decided by a ranking decision device in a device for canceling interference according to the embodiment 1 of the present invention.
Figure 3B:
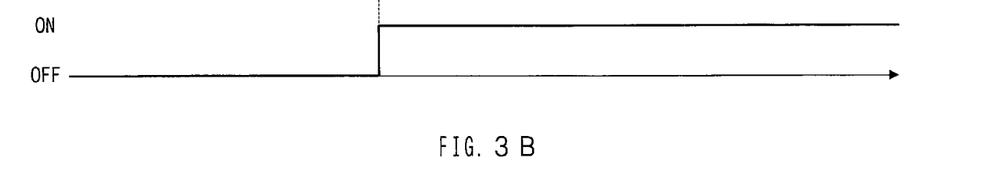
FIG. 3B is a schematic diagram illustrating a content of an updating-of-ranking signal in a device for canceling interference according to the embodiment 1 of the present invention.

Then, details of switching control of the switch 109 will be described, referring to FIG. 3A and FIG. 3B. FIG. 3A is a schematic diagram illustrating a result where all the symbols are arranged, based on a likelihood ranking decided by a ranking decision device in a device for canceling interference according to the embodiment 1 of the present invention. FIG. 3B is a schematic diagram illustrating a content of an updating-of-ranking signal in a device for canceling interference according to the embodiment 1 of the present invention. The switch 109 is connected to the ranking decision device 111, when updating-of-ranking operation is required, and to the re-spreading device 112, when it is not required. Hereinafter, the case where the switch 109 is connected to the ranking decision device 111 is expressed as "ON", and the case where the switch 109 is connected to the re-spreading device 112 is expressed as "OFF".

As shown in FIG. 3A, after the likelihood ranking is decided first by the ranking decision device 111, cancellation of interference concerning the first symbol 201 to the X-th symbol 202 is performed in, according to the above likelihood ranking. Thereafter, during from the (X+1)-th symbol 203 to the M-th symbol 204, updating of the likelihood ranking is performed every symbol by the ranking decision device 111 to cancel the interference. Here, M is obtained through multiplication of the total number of users by the number of symbols in one unit interval, that is, that of the total number of symbols of signals of each user in one unit interval by the total number of users. And the M-th symbol 204 is the lowest symbol in the likelihood ranking.

A method to decide an updating-of-ranking signal in the controlling part 110 will be described below, referring again to FIG. 2. In the first place, the highest symbol (the first symbol 201 in FIG. 3A) in the likelihood ranking decided first by the ranking decision device 111 gives the largest interference to other symbols due to the great likelihood.

As mentioned above, the first symbol 201 is subtracted from the reception signal from the delay device 102 by the subtraction device 113. Thereby, the reception signal after the subtraction becomes the signal in which the first symbol 201 and the interference by the above symbol are removed. However, in the reception signal after the above subtraction, not only the first symbol 201 with the greatest likelihood and the interference by the above symbol, but also the other part are removed, due to the great likeliness of the above symbol.

The accuracy of the obtained likelihood ranking is low, when updating of the ranking is performed by the ranking decision device 111, after performing the above operations (despreading, RAKE combining, hard decision, and likelihood calculation), using the reception signal in such a state. Thereafter, similar operations to those of the above are performed in order of the greatness of the likelihood to have further low accuracy of the likelihood ranking which is obtained by the ranking decision device 111. As a result, the accuracy of the demodulation data obtained according to the likelihood ranking with low accuracy becomes low (high error rate).

Therefore, the above operations (despreading, RAKE combining, hard decision, and likelihood calculation) are performed according to the likelihood ranking decided first by the ranking decision device 111 to output the demodulation data from the decision value buffer 107, in the present embodiment. That is, instead of the way the likelihood ranking is updated by the ranking decision device 111 every time a new likelihood is stored in the likelihood buffer 108, and the subsequent operations are performed, the subsequent ones are performed only according to the likelihood ranking decided first by the ranking decision device 111 without updating the likelihood ranking, in the present embodiment.

On the other hand, in case of symbols after a symbol with comparatively low likelihood ranking (the (X+1)-th symbol 203 in FIG. 3A), compared with a symbol with a ranking near to the highest one in the likelihood ranking, there is smaller influence of the interference on other symbols. Moreover, signals after subtraction by the subtraction device 113 become the signals in which the above symbols and interference by those symbols are removed. That is, other parts other than the interference to be cancelled by the above symbols, becomes very small, compared with those at the case of the above symbol with a ranking near to the highest likelihood ranking.

Therefore, after the (X+1)-th symbol 203, the accuracy of the updated likelihood ranking decided by the ranking decision device 111 becomes high, and that of the demodulated data also becomes high (low error rate). That is, comparing with the accuracy of the demodulation data in a case when the above operations are performed only according to the likelihood ranking decided first by the ranking decision device 111, the above accuracy obtained becomes higher (lower error rate), when similar operations are performed till the X-th symbol according to the likelihood ranking decided first by the ranking decision device 111, and the likelihood ranking is updated by the ranking decision device 111 every time a new likelihood is stored in the likelihood buffer 108, after the (X+1)-th symbol.

Then, in the present embodiment, the above operations are performed according to the likelihood ranking decided first by the ranking decision device 111, during from the first symbol 201 to the X-th symbol 202. Thereafter, updating of the likelihood ranking is performed by the ranking decision device 111, every time a new likelihood is stored in the likelihood buffer 108, and the above operations are performed, during from the (X+1)-th symbol 203 to the MJ-th symbol 204.

Therefore, the switch 109 is made OFF till the X-th symbol 202, as shown in FIG. 3B, after it is first made ON to decide the likelihood ranking by the ranking decision device 111. Moreover, the switch 109 is made ON during from the (X+1)-th symbol 203 to the final symbol (the M-th symbol 204 in this case).

As one example to decide the X-th symbol and the (X+1)-th symbol, there is a method to recognize a symbol (the X-th symbol) at the time when an error rate is reversed, using a measured result of the error rates, after the error rates of the demodulation data output by the decision value buffer 107 are measured, both in case of deciding the likelihood ranking by the ranking decision device 111 only the first time, and in case of updating the likelihood ranking by the device 111 every time a new likelihood is stored in the likelihood buffer 108.

By controlling of the switch 109 according to the above updating-of-ranking signals, not only the accuracy of the demodulation data output from the decision value buffer 107 is improved, but also the amount of operations required for demodulation of all the data is reduced. As shown above, the details of the updating-of-ranking signal have been described.

As mentioned above, according to the present embodiment, updating of the likelihood ranking is properly performed so that the accuracy of the demodulated data is improved, without updating the likelihood ranking every time a new likelihood is stored in a likelihood buffer, during demodulation of all the symbols of signals of all the users is completed. Thereby, as the frequency of updating the likelihood ranking becomes less, compared with that of a case where the likelihood ranking is updated every time a new likelihood is stored in a likelihood buffer while all the symbols of signals of all the users are demodulated, not only the amount of operations required for all the cancellation operations of interference is reduced, but also the accuracy of the obtained demodulation data is improved.

In the present embodiment, there have been described cases to decide the updating-of-ranking signal, based on influence given to other symbols by the amount of a likelihood of a symbol, as an example to reduce the amount of operations in all over the device, and improve the reliability of the demodulation data, but the present invention is not limited to the above cases. That is, any elements to reduce the amount of operations of all over the device and improve the reliability of the demodulation data is used for decision of the updating-of-ranking signals.

Embodiment 2

In an embodiment 2, the amount of operations required for all over the cancellation operations of interference is further reduced by changing the contents of the updating-of-ranking signals, compared with in the embodiment 1. A device for canceling interference according to the embodiment 2 will be described below, referring to FIG. 4A and FIG. 4B. Here, the configuration of the embodiment 2 is similar to that of the embodiment 1, except the updating-of-ranking signals, and the detailed description will be eliminated.

Figure 4A:
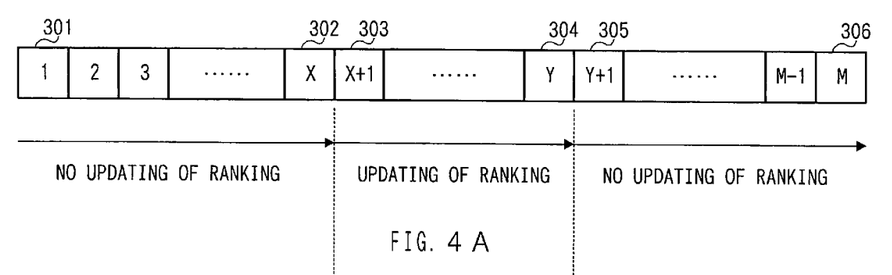
FIG. 4A is a schematic diagram illustrating a result where all the symbols are arranged, based on a likelihood ranking decided by a ranking decision device in a device for canceling interference according to an embodiment 2 of the present invention.
Figure 4B:
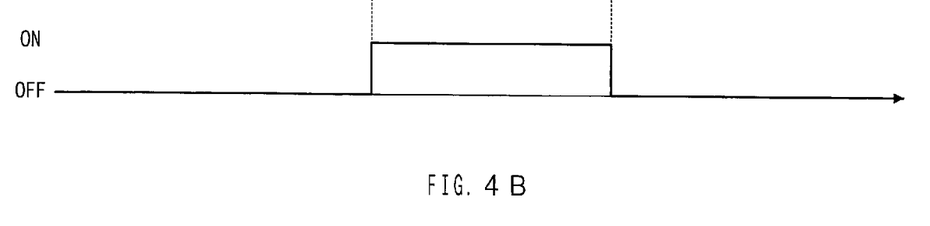
FIG. 4B is a schematic diagram illustrating a content of an updating-of-ranking signal in a device for canceling interference according to the embodiment 2 of the present invention.

FIG. 4A is a schematic diagram illustrating a result where all the symbols are arranged, based on a likelihood ranking decided by a ranking decision device in a device for canceling interference according to an embodiment 2 of the present invention. FIG. 4B is a schematic diagram illustrating a content of an updating-of-ranking signal in a device for canceling interference according to the embodiment 2 of the present invention.

Switching control of the switch 109 by the controlling part 110 will be described below, referring to FIG. 2, FIG. 3A, and FIG. 3B. In the embodiment 1, as the switch 109 is made ON at symbols near the symbol with the lowest likelihood ranking (for example, the (M−2)-th symbol), the likelihood ranking is updated by the ranking decision device 111, every time a new likelihood is stored in the likelihood buffer 108.

However, symbols with a likelihood ranking near to the lowest one have a tendency to have larger correlation with other at least one symbol. That is, there is no change in the accuracy of the demodulation data output from the decision value buffer 107 regardless of updating of the likelihood ranking, as the symbols with a likelihood ranking near to the lowest one are interfered with each other. Therefore, the updating operation of the likelihood ranking by the ranking decision device 111 is not be a factor to improve the accuracy of the demodulation data, at demodulation of a symbol with a likelihood ranking neat to the lowest one.

Then, as shown in FIG. 4A and FIG. 4B, first of all, the above operations are performed, according to the likelihood ranking decided first by the ranking decision device 111, during from the first symbol 301 to the X-th symbol 302, in a similar way to that of the embodiment 1, in the present embodiment. Thereafter, the above operations are performed while updating the likelihood ranking by the ranking decision device 111 every time a new likelihood is stored in the likelihood buffer 108, during from the (X+1)-th symbol 303 to the Y-th symbol 304. Moreover, the above operations are performed according to the likelihood ranking decided by the ranking decision device at the Y-th symbol, during from the (Y+1)-th symbol 305 through the final symbol 304.

As mentioned above, as the updating operation of the likelihood ranking by the ranking decision device 111 is eliminated in symbols having no relation with the accuracy of the obtained demodulation data according to the present embodiment, the amount of operations required for all over the cancellation operations of interference is reduced without influence on the accuracy of the obtained demodulation data, comparing with that of the embodiment 1.

Now, the device for canceling interference described in the above embodiments can be installed in base station devices and communication terminals, using the CDMA method.

①The device for canceling interference according to the present invention has a configuration comprising:

likelihood calculation means for calculating likelihood of each symbol included in a reception signal;

ranking decision means for deciding or updating a ranking of said each symbol, based on calculated likelihood;

control means for controlling updating operation of said ranking decision means;

demodulation means for demodulating a symbol with the highest position in the ranking; and cancellation means for canceling the modulated symbol from the reception signal.

According to the above configuration, an amount of operations required for demodulation of all symbols is reduced, as updating of the above ranking is decided as required at the time when predetermined symbols are cancelled from the reception signal, according to the ranking decided based on likelihood of symbols included in the reception signal. Therefore, it is possible to offer a device for canceling interference while reducing amount of operations for canceling interference.

②The device for canceling interference according to the present invention has a configuration, after the first decision of the ranking by said ranking decision means, said control means makes said ranking decision means decide the previously decided ranking as a new ranking, when a likelihood of a symbol cancelled by a cancellation means is greater than a first threshold; and makes said ranking decision means update the ranking, when the likelihood of the symbol cancelled by said cancellation means is equal to or lower than the first threshold.

According to the above configuration, the deterioration of the accuracy of the reception signal by cancellation of a symbol with a great likelihood is controlled, as likelihood ranking is decided based on amounts of likelihood of symbols included in the first reception signal; cancellation of interference is performed according to the above likelihood ranking till a symbol with a likelihood greater than the first threshold; and then cancellation of interference is performed according to the ranking updated every time one symbol is demodulated, Thereby, not only the amount of operations required for demodulation of all symbols is accurately reduced, but also the accuracy of the obtained demodulation data is surely improved.

③The device for canceling interference according to the present invention has a configuration, wherein said control means makes said ranking decision means decide the previously decided or updated ranking as a new ranking, when a likelihood of a symbol cancelled by said cancellation means is equal to or lower than a second threshold.

According to the above configuration, useless operations is eliminated, as updating of the likelihood ranking is not performed, when the amount of a likelihood is equal to or lower than the second threshold, that is, when cancellation of interference by symbols, for which the updating of the likelihood ranking has no effect on the accuracy of the modulation data, is performed. Therefore, the amount of operations required for all over the cancellation of interference is further reduced without influence on the accuracy of the obtained demodulation data.

④The communication terminal apparatus according to the present invention has a configuration comprising any one of the above devices for canceling interference.

According to the above configuration, it is possible to offer a communication terminal device to realize highly effective communication, as a device for cancellation of signal interference with a reduced amount of operations at cancellation of interference is installed.

⑤The base station apparatus according to the present invention has a configuration to perform wireless communication with the above communication terminal apparatus.

According to the above configuration, it is possible to offer a base station device performing excellent communication, as wireless communication with communication terminal devices realizing highly effective communication is performed.

⑥The base station apparatus according to the present invention has a configured comprising any one of the above devices for canceling interference.

According to the above configuration, it is possible to offer a base station device to realize highly effective communication, as a device for canceling interference realizing highly effective communication is installed.

⑦The communication terminal apparatus according to the present invention has a configuration to perform wireless communication with the above base station apparatus.

According to the above configuration, it is possible to offer a communication terminal device performing excellent communication, as wireless communication with base station devices realizing highly effective communication is performed.

⑧The method for canceling interference according to the present method has a configuration comprising:

likelihood calculation step for calculating likelihood of each symbol included in a reception signal;

ranking decision step for deciding or updating the ranking of said each symbol, based on calculated likelihood;

control step for controlling updating operation of said ranking decision step;

demodulation step for demodulating a symbol with the highest position in the ranking; and cancellation step for canceling the modulated symbol from the reception signal.

According to the above configuration, an amount of operations required for demodulation of all symbols is reduced, as updating of the above ranking is decided as required at the time when predetermined symbols are cancelled from the reception signal, according to the ranking decided based on likelihood of symbols included in the reception signal.

According to the present invention, it is possible to offer a device for canceling interference while reducing amount of operations for canceling interference, by proper updating of the likelihood ranking, based on the accuracy of the demodulation data due to the updating of the likelihood ranking.

This application is based on the Japanese Patent Application No. HEI11-095044 filed on Apr. 1, 1999. Entire content of which is expressly incorporated by reference herein.

INDUSTRIAL APPLICABILITY

The present invention is preferably used for the field of mobile communication systems using the CDMA method.

What is claimed is:

1. A device for cancelling interference comprising:

a likelihood calculation section that calculates a likelihood of correct reception for each of a plurality of symbols included in a reception signal;

a ranking decision section that makes a first decision of a first decided ranking of each of said symbols, based on respective calculated likelihoods by said likelihood calculation section;

a control section that controls an updating operation of said ranking decision section;

a demodulation section that demodulates a symbol having a highest position in the first decided ranking; and a cancellation section that cancels the symbol demodulated by said demodulation section from the reception signal, wherein after the first decision by said ranking decision section, said control section (i) makes said ranking decision section decide the first decided ranking as a new ranking of said symbols excluding the symbol canceled by said cancellation section, when the likelihood, calculated by said calculation section, of the symbol canceled by the cancellation section is greater than a first threshold, and (ii) makes said ranking decision section provide an updated ranking of said symbols excluding the symbol canceled by said cancellation section, when the likelihood, calculated by said calculation section, of the symbol canceled by said cancellation section is equal to or lower than the first threshold.

2. The device for cancelling interference according to claim 1, wherein said control section makes said ranking decision section decide one of said first ranking and said updated ranking as a new ranking of said symbols excluding the symbol canceled by said cancellation section, when the likelihood, calculated by said calculation section, of the symbol cancelled by said cancellation section is equal to or lower than a second threshold.

3. A method for cancelling interference comprising the steps of:

(a) calculating a likelihood of correct reception for each of a plurality of symbols included in a reception signal;

(b) making a first decision of a first decided ranking of each of said symbols, based on respective calculated likelihoods calculated in step (a);

(c) demodulating a symbol having a highest position in the first decided ranking;

(d) canceling the symbol demodulated by step (c) from the reception signal;

(e) after the first decision by said ranking decision section, (i) deciding the first decided ranking as a new ranking of said symbols excluding the symbol canceled by said cancellation section, when the likelihood, calculated by step (a), of the symbol canceled by step (d) is greater than a first threshold, and (ii) providing an updated ranking of said symbols excluding the symbol canceled by step (d), when the likelihood, calculated by step (a), of the symbol canceled by step (d) is equal to or lower than the first threshold.

* * * * *